Figure 1:
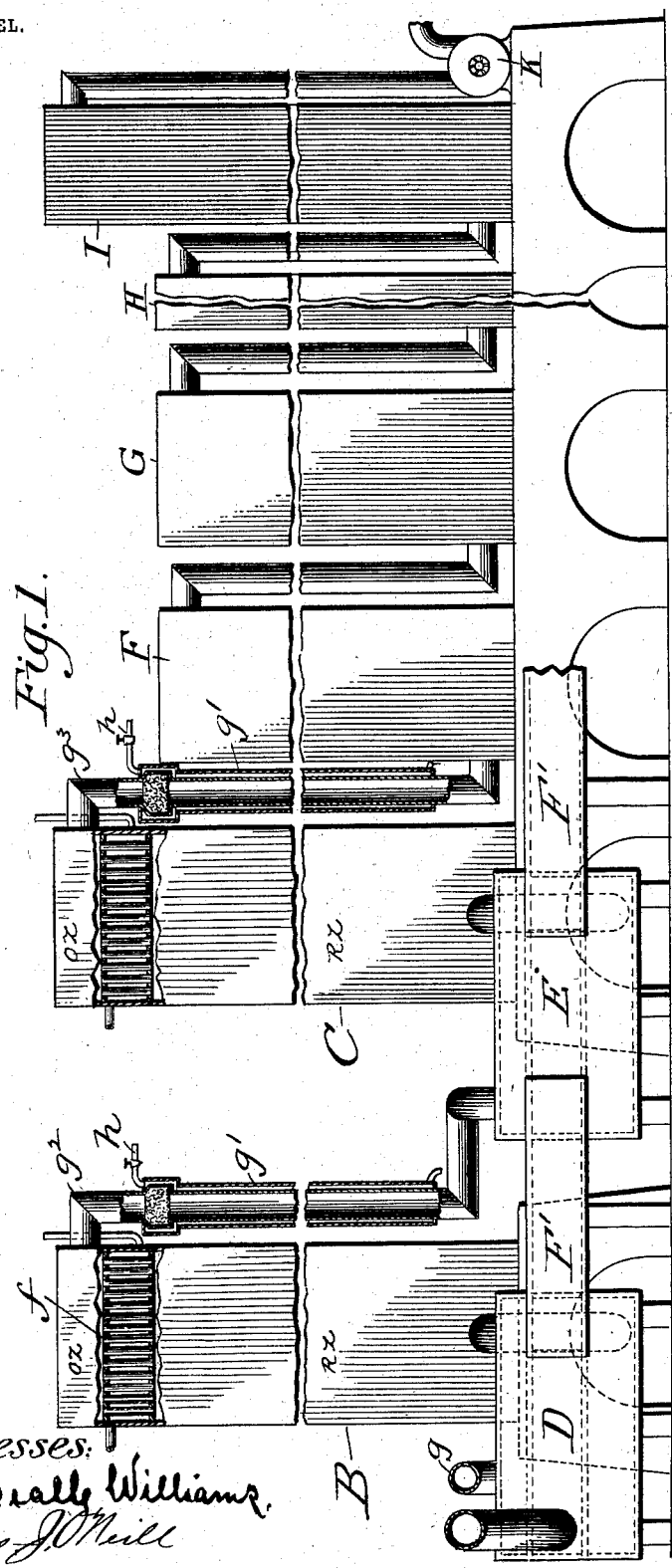

No. 729,643. PATENTED JUNE 2, 1903.
M. NEUMANN.
METHOD OF MAKING SULFURIC ACID.
APPLICATION FILED OCT. 10, 1902.
NO MODEL. 3 SHEETS—SHEET 2.

No. 729,643. Patented June 2, 1903.

UNITED STATES PATENT OFFICE.

MAX NEUMANN, OF HAMBORN, GERMANY, ASSIGNOR TO FRANZ MEYER, OF HAMBORN, GERMANY.

METHOD OF MAKING SULFURIC ACID.

SPECIFICATION forming part of Letters Patent No. 729,643, dated June 2, 1903.

Application filed October 10, 1902. Serial No. 126,721. (No specimens.)

*To all whom it may concern:*

Be it known that I, MAX NEUMANN, a subject of the Emperor of Germany, residing at and whose post-office address is Hamborn, Rheinland, Germany, have invented certain new and useful Improvements in Methods of Making Sulfuric Acid; and I do hereby declare the following to be a full, clear, and exact description of the invention, such as will enable others skilled in the art to which it appertains to make and use the same.

In the chamber process for the manufacture of sulfuric acid the reaction equations, which are also verified by the actual results obtained, call for the formation of two molecules of $H_2SO_4$ by means of two molecules of NO, which latter are potentially present in the $N_2O_3$ of said process, ($N_2O_3 = 2NO+O$). In the Glover process, however, the like two molecules of NO enter directly as such into the reaction and form three molecules of $H_2SO_4$. Therefore the same quantity of NO in the same space has fifty per cent. greater efficiency in the Glover process.

In the chamber process it is merely necessary that care be taken to remove the excess of heat of reaction incident to the intimate commingling of the gases. In the Glover process, on the other hand, in order to denitrate—*i. e.*, to decompose the nitroxylsulfuric acid by means of $SO_2$ and $H_2O$—a certain high initial temperature must be employed, such temperature, in fact, prevailing in the lower part of the ordinary Glover tower. Because of the reduction of the $N_2O_3$ to NO the operation involves an endothermic reaction—*i. e.*, it proceeds with the absorption of a part of the heat of formation of the $H_2SO_4$, which absorbed heat is subsequently restored in the next succeeding step of the process, (the formation of the nitroxylsulfuric acid,) together with the heat of reaction of said succeeding step, so that in this latter step or phase of the process much more energetic cooling is required than in working in accordance with the chamber process. Inasmuch, therefore, as heat and cold must act successively, the process can only proceed to advantage in sharply-defined successive phases—*i. e.*, only when hot and cold zones alternate with each other. Not only does the same quantity of NO develop from the Glover reaction equation alone in the same space, an increased efficiency of fifty per cent. in comparison to the chamber process, but it is also to be noted that in the Glover process the efficiency is still further very considerably increased, because of the well-known fact that the Glover process proceeds much more rapidly than the relatively slow-working-chamber process.

The purpose of the present invention is to utilize these considerations by providing a succession of hot and cold zones separated in time and space from each other aside from the ordinary single Glover tower heretofore employed and especially to employ a number of Glover towers in the general operation, so that the extraordinarily complete and effective Glover process may be made available to as great an extent as possible in the production of sulfuric acid.

The temperature required for the decomposition of the nitroxylsulfuric acid rises progressively as the gases become poorer in $SO_2$. Therefore the method is of course commercially advantageous only as long as the excess of $SO_2$ over O is relatively great, so that the necessary temperature may be obtained with the cheap materials available in practice.

The apparatus may be considerably varied. For instance, it may consist of flues, towers, and the like interposed between Glover tower and lead-chambers or connected to the Glover tower alone, care being taken to establish alternate hot and cold zones in said interposed flues or towers by the introduction of heating and cooling devices. Inasmuch as the said flues and towers are traversed in the direction of motion simply by the gases alone, the full Glover effect cannot of course take place, but only a partial Glover effect.

An apparatus adapted for the practice of the invention is illustrated in the accompanying drawings, which, however, merely exhibit one form or modification thereof, which is here shown for the purpose of illustration and not with the intention of limiting the practice of the invention to the specific arrangement of apparatus illustrated.

Figure 2:
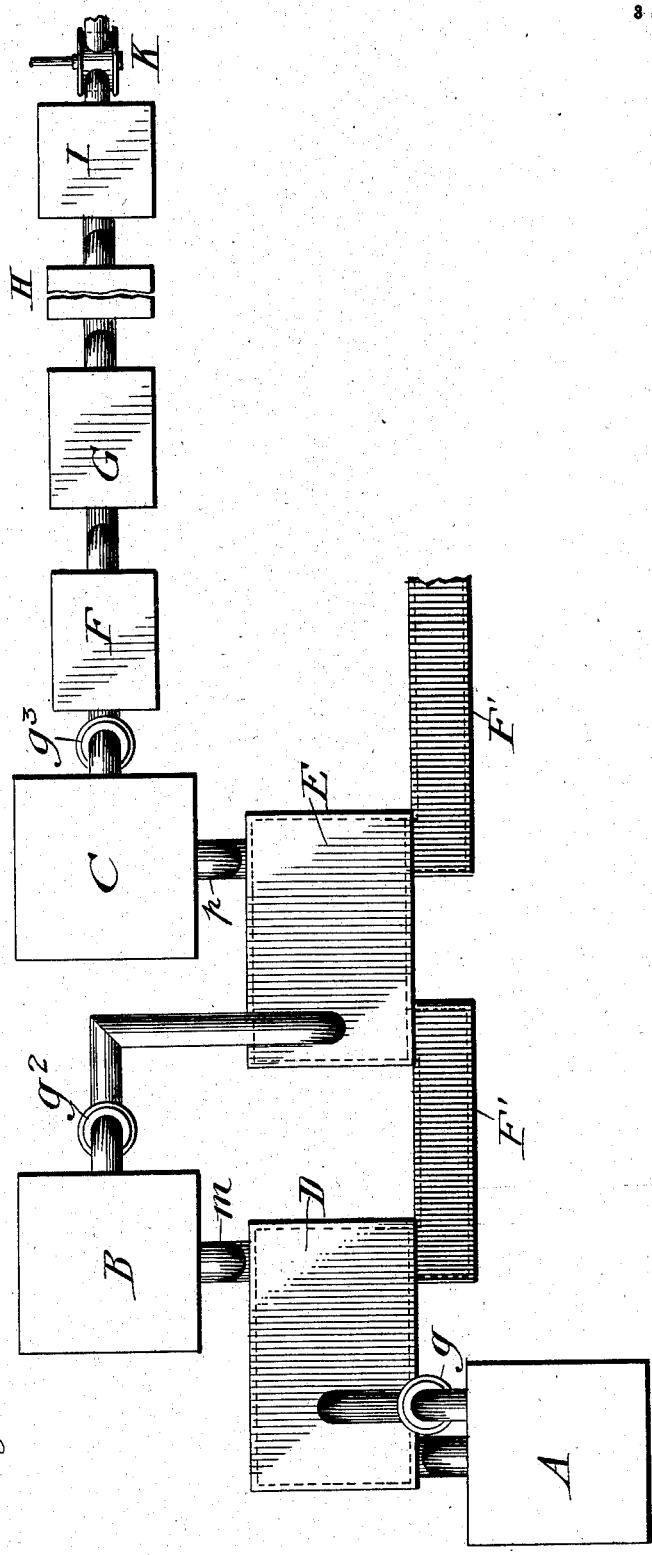
Figure 3:
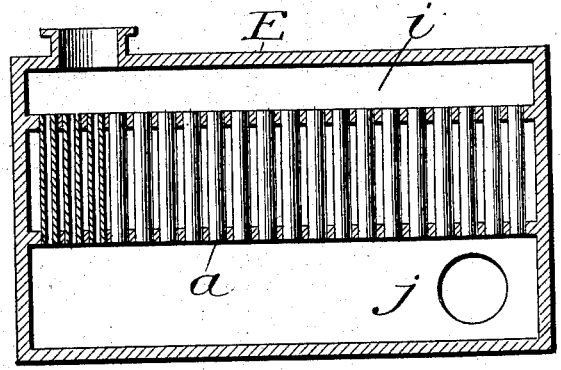
Figure 5:
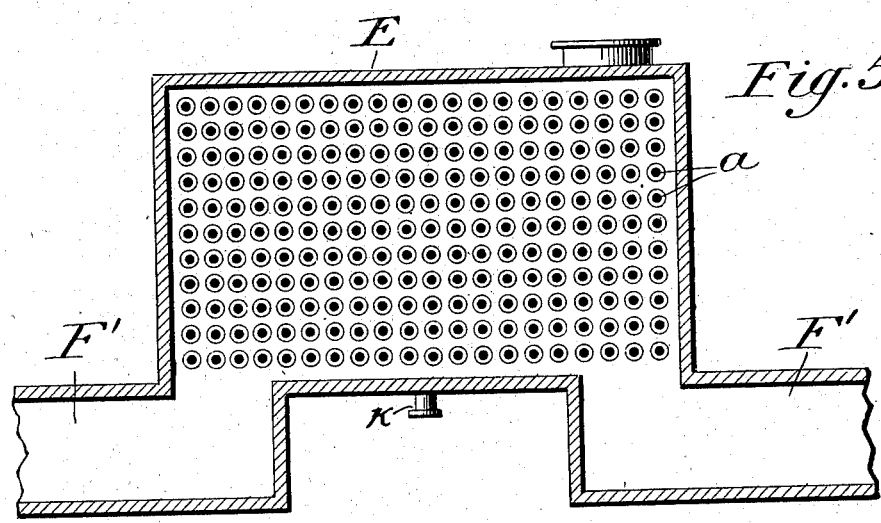
Figure 4:
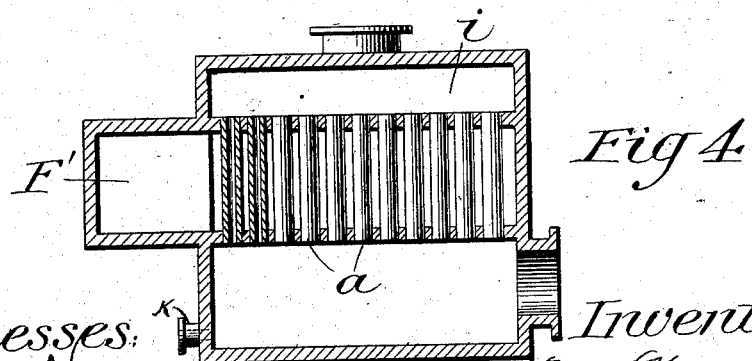

In the accompanying drawings, Figure 1 represents in front elevation apparatus adapted for the practice of the invention, certain portions of the apparatus being exhibited as broken away. Fig. 2 represents a top plan view thereof. Figs. 3, 4, and 5 represent sectional details.

Similar letters of reference indicate similar parts throughout the several views.

Referring to the drawings, A, B, and C represent three towers of the Glover type, and D E represent two heating-chambers having an outer jacket of heat-insulating material to protect them as far as possible against heat radiation and provided at its lower or inferior part with an inner jacket of lead. The chambers D E, as shown more fully in Figs. 3, 4, and 5, contain a series of tubes or flues $a$, of earthenware, lava, or other refractory acid-resisting material. These chambers receive from the supply-flue F' the hot gases from a pyrites furnace or furnaces, which in their passage through the chambers D E heat externally the tubes contained therein. After passing through the chambers D E the furnace-gases having parted with a portion of their heat enter the lower portion of the Glover tower A at a temperature of but 160° to 190° centigrade, which is more than sufficient to effect complete denitration. The gases, as usual, pass upwardly through the Glover tower A, meeting on their way upward the customary downwardly-trickling mixture of nitrose and dilute acid. As in every Glover tower a complete Glover zone, with alternate upward and downward movement of the reagents, is established—to wit, first, an upper zone for the formation of nitroxyl, which I have indicated in the drawings by the letters O Z, because of the oxidizing action taking place therein, and, second, a lower or reducing zone for denitration, (indicated by the letters R Z.)

Up to a certain limit the colder the "oxidizing zone" the more NO molecules are compelled each time to move downward to be combined into nitroxylsulfuric acid. For the obtaining and maintenance of the ideal low temperature cooling-pipes $f$, of acid-resisting material, are inserted in the upper part of the towers, around which pipes a circulation of cold air or cold liquid is maintained.

The condensation of steam in the upper part of the tower (and the consequent premature beginning of denitration and accompanying diminution of the active reaction-space) is not to be feared, for the reason that at the temperatures of admission of 200° centigrade and thereunder prevailing in my apparatus much less steam is present than at the admission-temperatures of 350° to 450° centigrade of the ordinary Glover tower and because sprinkling acid of corresponding strength (57° to 58° Baumé) may be selected, so that any precipitated or condensed water would be used up at once to bind the new $H_2SO_4$. The unconverted gases ($NO, SO_2, O$) and a small quantity of $H_2O$ escape at the upper part of the tower A and pass downward through the pipe $g$. On their downward course they are subjected to mixing and cooling, for which latter purpose the pipe $g$ may be conveniently provided with a cooling-jacket $g'$, through which cold water from a pipe $h$ may be continuously passed whereupon nitroxylsulfuric acid will be formed. Should there be too small a quantity of water present, a suitable amount may be admitted at any suitable point by means of an atomizer. The enlargement $x$ may conveniently serve to contain loose screening or filtering material, as indicated, so as to protect the lava-pipes of the heaters against clogging. The pipe $g$ discharges into the upper portion $i$ of the preheater D, whence the flow is through the narrow heating-pipes $a$ into the lower portion $j$, the transformation into $H_2SO_4$ taking place according to the Glover equation. Therefore in this way a second pair of oxidizing and reducing zones is established during the simple onward travel of the gas mixture and with the advantage that the fifty per cent. greater efficiency of the Glover equation is obtained.

A portion of the acid formed in D collects on the bottom of that chamber and may be drawn off through the opening $k$. On account of its high concentration it is high in nitrose—i. e., it must pass through the Glover tower for denitration, in this manner bringing the sprinkling acid up to the desired strength of 57° to 58° Baumé.

From D the gas mixture heated up to from 170° to 200° centigrade enters through the pipe $m$. The lower portion of the Glover tower B issues from the top of said tower into the downtake $g^2$ and thence into the preheater E, which latter corresponds in all respects with the like preheater D. From preheater E it passes by pipe $p$ into the lower part of the Glover tower C and thence through the downtake $g^3$ into the first of the series of Lunge-Rohrmann towers F G H and Gay-Lussac tower I, escaping finally through the exhaust-blower K. It will of course be understood that the towers B and C and the downtakes $g^2$ and $g^3$ are provided with like cooling devices as the tower A and downtake $g$ and that the plate-towers may be replaced by lead-chambers. By thus dividing up and utilizing at suitable places the heat of the gases from the pyrites-furnaces and by the expedient of alternately cooling said gases it has been made possible to conduct the gas mixture through three complete Glover towers each having one pair of oxidizing and reducing zones with up-and-down movement of the agents and in addition thereto two further pairs of oxidizing and reducing zones with simple onward travel of the gas. It is self-evident that it is also possible to substitute for the heat of the pyrites-furnace gases direct heating or heating by fire-tubes from any furnace-stack flue, although in that event, with the danger that should any of the heating-tubes burst, a portion of the Glover gases would be drawn through the burst tube or tubes and pass off into the stack. Therefore for absolute security it is desirable in the present arrangement to make use of the heat of the pyrites-furnace gases, inasmuch as thereby all gas losses are excluded and for the further reason that it is more convenient and more economical and likewise because it becomes impossible to overheat the Glover towers, and thus prejudicially effect the Glover filling. After traversing the three Glover towers and the two preheaters the gas mixture becomes relatively so poor in $SO_2$ that the temperatures thereafter necessary for transformation according to the Glover equation cannot be obtained. It is therefore preferable to conduct the remaining gas into a lead chamber or chambers and work it up there or (if it is desired to dispense with a lead-chamber) in lieu thereof to employ a few Lunge-Rohrmann plate-towers.

Having thus described my invention, what I claim is—

1. The method of making sulfuric acid, consisting in conducting the acid-producing gases through a plurality of Glover towers, and through alternate heating and cooling zones intermediate of said towers; substantially as described.

2. The method of making sulfuric acid, consisting in conducting the acid-producing gases through a plurality of Glover towers, and through alternate heating and cooling zones intermediate of said towers, the temperature of successive heating zones being higher, the poorer the gases are in sulfurous acid and the richer they are in oxygen; substantially as described.

3. The method of making sulfuric acid, consisting in passing kiln-gases through a plurality of Glover towers, and through alternate heating and cooling zones intermediate of said towers, the heating zones deriving their heat from the waste heat of the kiln-gases; substantially as described.

4. The method of making sulfuric acid, consisting in passing kiln-gases through a plurality of Glover towers, and through alternate heating and cooling zones intermediate of said towers, the heating zones deriving their heat from the waste heat of the kiln-gases and in inverse order from the last to the first of the series; substantially as described.

In testimony whereof I affix my signature in presence of two witnesses.

MAX NEUMANN.

Witnesses:
HENRY HASPER,
WALDEMAR HAUPT.